July 24, 1928.
R. C. BICKNELL
1,677,948
SPRING SUSPENSION FOR AUTOMOBILE CHASSIS FRAMES
Filed March 22, 1927
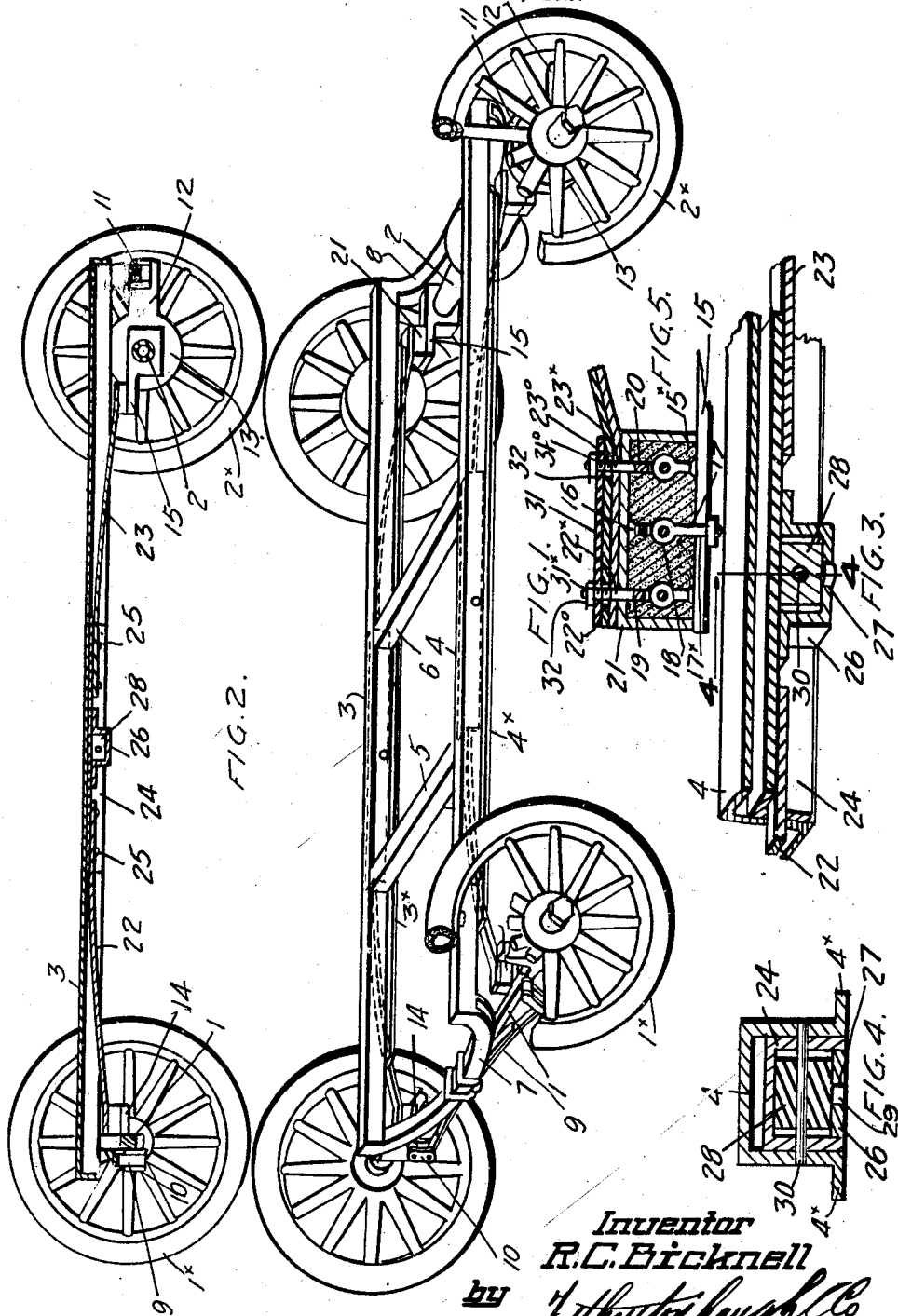
Inventor
R.C. Bicknell
by
Attys.

Patented July 24, 1928.

1,677,948

UNITED STATES PATENT OFFICE.

RUPERT CARL BICKNELL, OF TORONTO, ONTARIO, CANADA.

SPRING SUSPENSION FOR AUTOMOBILE CHASSIS FRAMES.

Application filed March 22, 1927. Serial No. 177,385.

My invention relates to improvements in spring suspensions for automobile chassis frames, and the object of the invention is to devise a spring suspension which will reduce torsional strain in the chassis frame, eliminate sag, prevent galloping, rolling and pitching of the body, increase stability and thereby provide a cushioning action which will render the automobile smooth and easy running under all conditions, and it consists essentially of the arrangement and construction of parts as hereinafter more particularly explained.

Fig. 1 is a general perspective view of my chassis frame mounted by my spring suspension means on the front and rear axles of an automobile.

Fig. 2 is a longitudinal sectional view taken through the center of one of the side bars of the chassis frame.

Fig. 3 is an enlarged sectional detail showing the connection between the side suspension means and the chassis frame.

Fig. 4 is a transverse sectional view on line 4—4 Figure 3.

Fig. 5 is an enlarged sectional detail of the cushioning mount carried by the axles and upon which the ends of the side suspension springs bear.

In the drawing like characters of reference indicate corresponding parts in each figure.

1 indicates a front axle, 2 a rear axle of the usual type upon which are mounted the front and rear wheels 1ˣ and 2ˣ in the usual manner. 3 and 4 are the side bars of the chassis frame which are inverted U-shaped in cross section, the lower edges being provided with laterally extending reinforcing flanges 3ˣ and 4ˣ. The side bars 3 and 4 are connected together by the intermediate transverse members 5 and 6 and the end transverse members 7 and 8.

9 is a transverse leaf spring secured centrally to the transverse member 7, the central portion of the leaf spring fitting within the transverse member 7 which is inverted U-shaped in form. The ends of the spring 9 are connected by knuckle links 10 to the front axle 1. 11 is a similar spring similarly mounted on the rear transverse bar 8 and similarly connected to the lug extensions 12 of the brake housings 13 of the rear wheels 2ˣ.

On each end of the front and rear axles are provided table brackets 14 and 15 suitably secured to the axles or formed integral therewith. To each bracket is secured a cushion block 15ˣ, of resilient material such as solid rubber, by means of a divided bolt, the members 16 and 17 of which are connected together by a knuckle joint 18.

It will be noted on referring to Figure 5 that the head of the member 16 is located at the top of the block 15ˣ, the bolt extending through the block and through an orifice 17ˣ formed in the table 14 or 15.

19 and 20 are bolts similarly constructed to the bolt 17. The bolts 19 and 20 however, are inverted, the head of the bolt being located at the bottom of the block 15ˣ and the opposite end of the bolt extending upwardly through the top of the block. 21 is a metallic casing in which the block 15ˣ is contained. 22 and 23 are the members of the side spring suspension, the free ends of which bear upon the top of the casing 1 and are connected thereto in a manner hereinafter described.

24 is an inverted channel member fitting within each of the side members 3 and 4 of the chassis frame centrally thereof. The inner ends of the members 22 and 23 extend into the ends of the channel 24 and are secured therein by means of rivets 25.

It will be noted particularly on referring to Figure 3 that there is an interspace between the top of the channel member 24 and the opposing portion of the corresponding side bar 3 or 4 so as to permit of a slight swinging movement within the side bar of the chassis frame as hereinafter described.

26 is a U-shaped strap secured within the channel member 24 centrally of its length and provided in the bottom thereof with a central orifice 27. 28 is a block which fits within the strap 26 and is provided with a downwardly extending stem 29 fitting within the orifice 27 so that the block 28 swings upon a vertical axis. 30 is a cross pin extending centrally through the block in a transverse direction and through the side walls of the members 3 and 4.

The ends of the spring members 22 and 23 as hereinbefore stated bear upon the top of the casing 21. The spring members 22 and 23 are preferably formed with a double leaf as indicated in Figure 5. The lower leaf rests directly upon the casing 21 and is provided with orifices 22ˣ and 23ˣ through which the upper members of the bolts 19 and 20 extend, the bolts fitting such orifices. The upper leaf is provided with slotted or enlarged orifices 22° and 23° registering with the orifices 22ˣ and 23ˣ and through which the bolts 19 and 20 also extend.

31 is a retaining plate provided with orifices 31ˣ and 31° through which the upper ends of the bolts 19 and 20 extend being secured by nuts 32 bearing upon the upper face of the plate 31.

It will thus be seen that when the tendency is for the springs 22 and 23 to spread and relax, that such movement is resisted or cushioned by the bolts 19 and 20 embedded in the cushioned block 15ˣ.

From this description it will be seen that I have devised a simple construction of spring suspension for chassis frames which will tend to reduce torsional strain in the frame, eliminate sag, oppose any tendency for the body to roll or pitch and which will provide a cushioned easy riding action which will be easy running and have the best riding qualities.

What I claim as my invention is:—

1. In a spring suspension device for automobiles, the combination with the front and rear axles, of a chassis frame, the members of which are inverted U-shaped in cross section, transverse suspension springs located at each end of the frame, means for supporting the ends of the transverse springs upon the axles, longitudinal suspension springs located in the side members of the frame, and connecting means between the ends of the spring and the front and rear axles in proximity to each end thereof.

2. In a spring suspension device for automobiles, the combination with the front and rear axles, chassis frame and spring supports at the end of the frame, of side suspension means comprising an inverted U-shaped channel member mounted centrally of its length within the side bars of the chassis frame to swing in a vertical plane, leaf springs secured at their ends within the ends of the channel bar, and means for supporting the outer end of the spring upon the front and rear axles.

3. In a spring suspension device for automobiles, the combination with the front and rear axles, chassis frame and spring supports at the end of the frame, of side suspension means comprising a transverse pin extending through the side walls of the side bars of the chassis frame, a block mounted thereon, a channel bar mounted upon the block to swing, and leaf springs extending from each end of the channel bar and mounted at their free ends upon the front and rear axles.

RUPERT CARL BICKNELL.